United States Patent [19]
Schneider et al.

[11] Patent Number: 5,718,488
[45] Date of Patent: Feb. 17, 1998

[54] DAMPER FOR DAMPING FLUID OSCILLATIONS IN A HYDRAULIC, SLIP-CONTROLLED MOTOR VEHICLE BRAKE SYSTEM

[75] Inventors: Steffen Schneider, Tamm; Ernst-Dieter Schaefer, Brackenheim; Guenter Krenz, Steinheim, all of Germany

[73] Assignee: Robert Bosch GmbH, Stuttgart, Germany

[21] Appl. No.: 736,689

[22] Filed: Oct. 25, 1996

[30] Foreign Application Priority Data

Oct. 26, 1995 [DE] Germany .............. 195 39 780.0

[51] Int. Cl.⁶ .................................................. B60T 17/06
[52] U.S. Cl. ................... 303/87; 138/30; 303/116.4
[58] Field of Search .................. 303/87, 116.4; 138/30.31

[56] References Cited

U.S. PATENT DOCUMENTS 5,058,961 10/1991 Mergenthaler et al. .......... 303/116.2
5,205,309 4/1993 Cardenas et al. .................... 303/87
5,540,489 7/1996 Linkner ......................... 303/116.1

FOREIGN PATENT DOCUMENTS 4336464 4/1995 Germany.

*Primary Examiner*—Matthew C. Graham
*Attorney, Agent, or Firm*—Edwin E. Greigg; Ronald E. Greigg

[57] ABSTRACT

An oscillation damper that has a cup-shaped elastomer diaphragm body, with a bottom diaphragm. The diaphragm body is received tightly on an opening side in a bore of a housing, and fits around a protrusion of a closure body that closes the bore. Between the closure body and the diaphragm, a support body having an end face that is concave toward the diaphragm is received in the diaphragm body. A void formed between the diaphragm and the support body communicates with the atmosphere, through a conduit embodied on the support body and through an opening in the closure body. The oscillation damper can be used in hydraulic slip-controlled motor vehicle brake systems.

5 Claims, 1 Drawing Sheet

//5,718,488

DAMPER FOR DAMPING FLUID OSCILLATIONS IN A HYDRAULIC, SLIP-CONTROLLED MOTOR VEHICLE BRAKE SYSTEM

BACKGROUND OF THE INVENTION

The invention is based on an oscillation damper for damping fluid oscillations in a hydraulic, slip-controlled motor vehicle brake system.

One such oscillation damper is already known, with a circular, substantially flat diaphragm body (German Patent Disclosure DE 43 36 464 A1). A support body that keeps the diaphragm body in the housing bore acts as a fixed boundary wall for the void of the oscillation damper, demarcated from the brake fluid by the diaphragm. The conduit leading to the atmosphere is embodied, in the known embodiment, as a bore originating in the concave end face of the support body.

The oscillation damper serves, in the drive slip traction control mode, to avoid not only longitudinal oscillations in the brake fluid located in the pump intake line that are caused by the pump type used in the brake system, and oscillation cavitation, so that an adequately large volumetric stream for a rapid pressure buildup in the wheel brake cylinders can be supplied by the pump. Another purpose of the oscillation damper is to reduce the pressure surge, occurring in the lined master cylinder, at the end of the drive slip traction control mode.

Since in driver-actuated braking, the brake pressure generated by the master cylinder also acts on the diaphragm of the oscillation damper, the diaphragm is pressed against the support body, so that the danger of damage to the diaphragm, on the edge toward the void of the bore in the support body leading to the ambient air increases. Yet it must be avoided under all circumstances that breakage of the diaphragm could cause a loss of fluid and hence a failure of the brake system.

OBJECT AND SUMMARY OF THE INVENTION

The oscillation damper according to the invention has an advantage over the prior art that the conduit is extended, beginning on the edge of the void, around the support body toward the back side thereof and has a cross-sectional shape that precludes injury to the diaphragm. The concave end face of the support body is free of openings, so that here as well there is no danger of damage. A failsafe diaphragm can be made thinner than that in the known embodiment. The characteristic of the oscillation damper can as a result be varied in a simple way.

Further embodiments of and improvements to the oscillation damper are possible with the provisions set forth hereinafter.

With the embodiment of the oscillation damper recited herein, in pump operation an unthrottled guidance of the air displaced between the void and the atmosphere is attained, especially if many channels are extended to the opening in the closure body.

The further feature of the oscillation damper disclosed has the advantage that the support body can be snapped into the diaphragm body, thus being positionally secured in a way that is favorable from an installation standpoint.

In the same way, the improvement of the oscillation damper is advantageous, because once again with simple means positive engagement between the diaphragm body and the closure body is attained by the engagement of the diaphragm body base with the closure body groove, and the assembly unit thus formed can be inserted into the housing bore and secured in it without the danger of separation of the parts.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
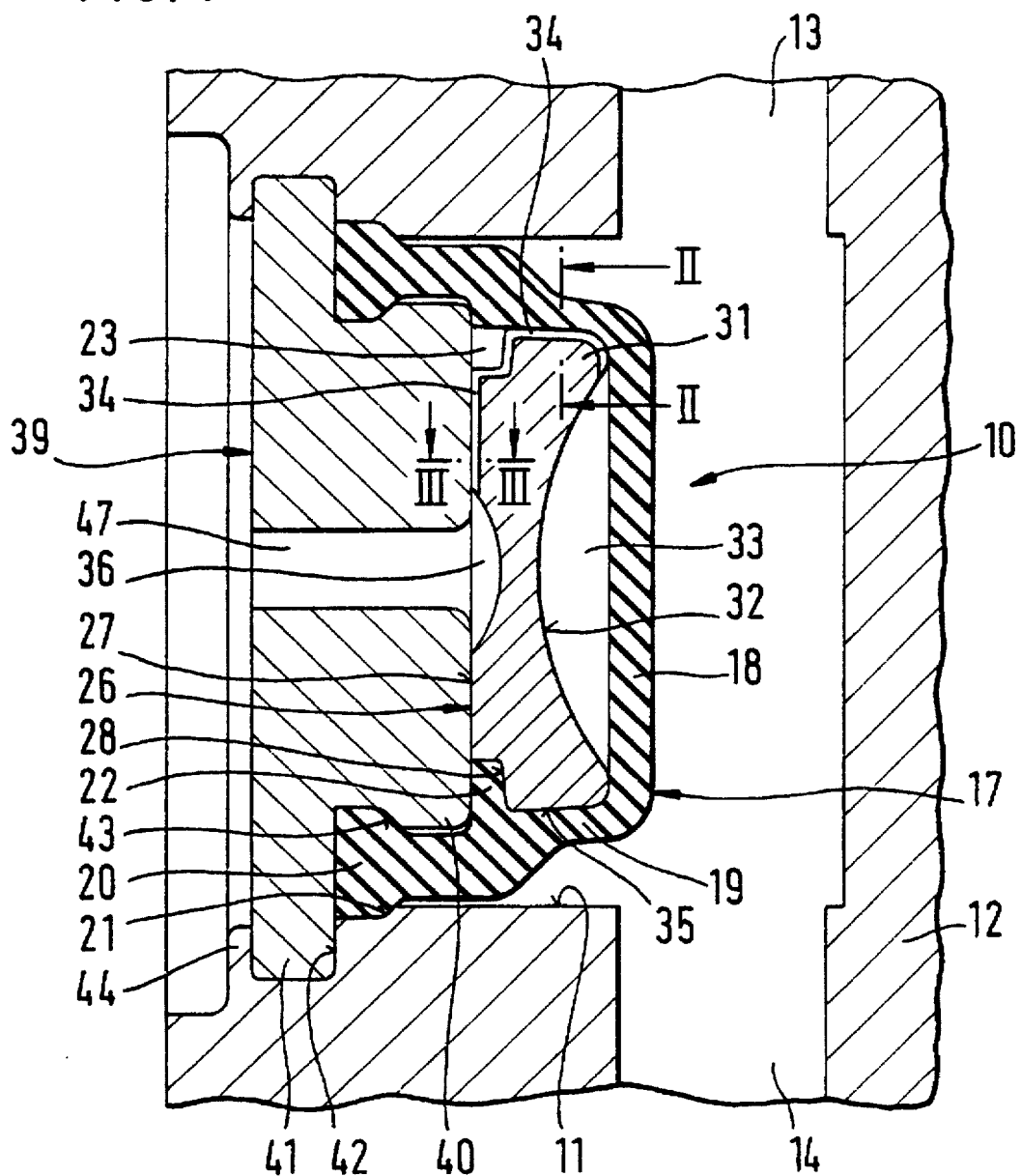
FIG. 1 is a longitudinal section through the damper.

An oscillation damper 10 shown in FIG. 1 of the drawing for damping fluid oscillations is intended for use in a hydraulic slip-controlled brake system of motor vehicles, as has been described in the German Reference DE 43 36 464 A1 referred to at the outset. The oscillation damper 10 is disposed in a stepped bore 11 of a housing 12 that also receives valves, pumps, lines and other elements of the aforementioned brake system (not shown). The bore 11 therefore communicates through a line segment 13 with a master cylinder having a container for brake fluid and through a line segment 14 with the intake side of a self-aspirating reciprocating piston pump and with at least one wheel brake cylinder. With the pump, brake pressure in the wheel brake cylinder can be generated in the drive slip traction control mode.

The oscillation damper 10 has a cup-shaped diaphragm body 17 disposed in the bore 11 of the housing 12. The diaphragm body has a diaphragm 18, toward the bottom and oriented toward the two line segments 13 and 14, of relatively slight, uniform thickness. Extending from the diaphragm 18 is a jacket wall 19, which on its free end has an encompassing base 20 that is widened in cross section toward the inside and outside. It is seated in a step 21 of the housing bore 11. On the inside of its jacket wall 19, the diaphragm body 17 has a radially inward-protruding, encompassing protrusion 22, which in some portions has at least one opening 23. The diaphragm body 17 comprises the elastomer known as ethylene propylene diene rubber (EPDM), which is resistant to brake fluid. On the line side, the diaphragm body 17 is exposed to the brake fluid.

Adjoining the diaphragm 18, a disklike support body 26 is received in the diaphragm body 17. The support body fills the diaphragm body 17 radially and extends axially over approximately half the length of the jacket wall 19. At the transition to its back side 27 remote from the diaphragm 18, the support body 26 has an encompassing, steplike recess 28 on its periphery, which is engaged by the protrusion 22 on the jacket wall 19 of the diaphragm body 17. The support body 26 is accordingly snapped into the diaphragm body 17. The at least one opening 23 makes the snap-in operation easier.

Figure 2:
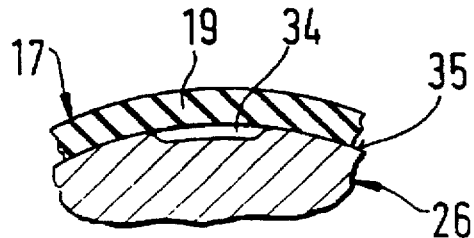
FIGS. 2 and 3 are cross sections on a larger scale through regions of the oscillation damper taken along the lines II—II and III—III of FIG. 1.
Figure 3:
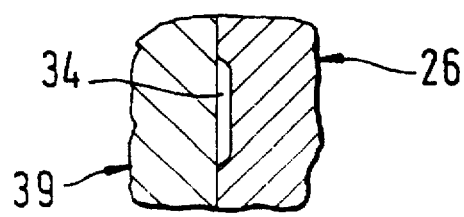

With its rounded edge 31, the support body 26, which may be of plastic or metal, engages the inside of the diaphragm 18 of the diaphragm body 17. Inside the edge 31, the support body 26 has a concave end face 32, so that an air-filled void 33 is formed between the support body and the diaphragm 18. The diaphragm 18 can be pressed by the brake fluid pressure against the end face 32 of the support body 26. Extending from this void 33 is at least one channel 34, which extends radially past the edge 31, extends axially along the jacket 35 of the support body 26, passes through the recess 28, and on the back side 27 thereof discharges radially, or in other words extending in raylike form, into a central indentation 36 of the support body 26. The channel 34 is relatively shallow and has rounded transitions to the adjoining surfaces of the support body 26 (see FIGS. 2 and 3). The channel 34 has a width amounting to a multiple of its depth. Upon a deformation of the diaphragm body 17 into the channel 34, there is no danger of damage to the diaphragm 18 or the jacket wall 19.

The support body 26, with its side 27 remote from the void 33, adjoins a disklike closure body 39 of the oscillation damper 10. The closure body 39 has a protrusion 40, with which it protrudes into the diaphragm body 17 and engages the support body 26. Toward the discharge side of the housing bore 11, the closure body 39 has a flange 41, with which it is braced against a shoulder 42 of the bore. At the transition between the protrusion 40 and the flange 41, the closure body 39 has an encompassing groove 43, which is engaged by the base 20 of the diaphragm body 17. Because of this design, the closure body 39, like the support body 26, can be snapped into the diaphragm body 17 before the joined-together parts are inserted into the housing bore 11. The closure body 39 is retained in the bore 11 by means of an embossed connection 44 produced by positive displacement of the material comprising the housing. In this joining state the base 20 of the diaphragm body 17 is fastened in the housing bore 11 so as to be pressure-tight.

While the housing bore 11 is hermetically sealed by the diaphragm body 17, the void 33 conversely communicates with the atmosphere. To that end, the closure body 39 has a central opening 47, with which the indentation 36 of the support body 26 corresponds. An exchange of air can therefore take place between the void 33 and the channel 34 forming a conduit, as well as through the indentation 36 and the opening 47.

The mode of operation of the oscillation damper 10 is as follows:

On operation of the reciprocating piston pump for the sake of drive slip traction control, both longitudinal fluid oscillations and oscillation cavitation can occur in the brake-fluid-filled line Segments 13 and 14 between the master cylinder and the intake side of the pump. The periodic inducement of the oscillation is dictated by the design of the pump. With the aid of the oscillation damper 10, which with the void 33 furnishes an air-filled compression chamber and which outside the diaphragm body 17, together with the bore 11, furnishes an expansion chamber filled with brake fluid, an additional elasticity or damping is introduced into the line segments 13 and 14, so as to shift the natural frequency of the brake fluid column between the master cylinder and the reciprocating piston pump to very low values, until the excitation by the pump takes place in the supercritical range. Longitudinal fluid oscillations and oscillation cavitation are avoided. The volumetric stream of brake fluid furnished by the pump is made uniform and is increased.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An oscillation damper (10) for damping fluid oscillations in a hydraulic slip-controlled brake system of motor vehicles, said oscillation damper comprising:

a diaphragm body (17) of an elastomer, fastened on an edge tightly in a bore (11) of a housing (12), which is exposed to a brake fluid on one side of a diaphragm (18) and another side of the diaphragm defines a void (33);

the void (33) in turn is defined by a support body (26), which engages the diaphragm (18) of the diaphragm body (17) by its edge, with a concave end face (32) against which the diaphragm (18) can be pressed by the brake fluid;

the support body (26), with its side remote from the void, adjoins a closure body (39) of the housing bore (11);

the void (33) communicates with the atmosphere through at least one conduit (34) of the support body (26) and an opening (47) of the closure body (39), the diaphragm body (17) is cup-shaped, and a bottom wall of the diaphragm body forms the diaphragm (18);

the support body (26) is disposed inside the diaphragm body (17), radially filling the diaphragm body;

the at least one conduit of the support body (26) is embodied as a shallow channel (34), which originating at the edge of the void (33) leads along a jacket (35) and a side (27) remote from the void of the support body (26) to the opening (47) of the closure body (39).

2. The oscillation damper of claim 1, in which the channel (34) has a width corresponding to a multiple of its depth.

3. The oscillation damper of claim 1, in which the support body (26), in the center of its side (27) remote from the void, has an indentation (36) that corresponds with the opening (37) of the closure body (39), into which indentation the at least one channel (24) discharges, extending in raylike form.

4. The oscillation damper of claim 1, in which the diaphragm body (17), on an inside of its jacket wall (19), has a radially inward-protruding protrusion (22), which encompasses the jacket wall at least in some portions and which engages a recess (28), toward the closure body, of the support body (26).

5. The oscillation damper of claim 1, in which the diaphragm body (17), on a free end of its jacket wall (19), has an encompassing base (20), of widened cross section radially inward and outward, with which base it is seated, both in an encompassing groove (43) of the closure body (39) that with a protrusion (40) engages the inside of the diaphragm body (17) as far as the support body (26), and in a step (21) of the housing bore (11), in which the closure body (39) is retained by an embossed connection (44).

* * * * *